(12) United States Patent
Goren et al.

(10) Patent No.: US 11,366,700 B1
(45) Date of Patent: *Jun. 21, 2022

(54) HIERARCHICAL WORKLOAD ALLOCATION IN A STORAGE SYSTEM

(71) Applicant: VAST DATA LTD., Tel Aviv (IL)

(72) Inventors: Avi Goren, Tel Aviv (IL); Yogev Vaknin, Tel Aviv (IL); Asaf Levy, Tel Aviv (IL); Oded Sonin, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,242

(22) Filed: Jun. 16, 2021

Related U.S. Application Data

(63) Continuation of application No. 17/249,463, filed on Mar. 2, 2021, which is a continuation-in-part of application No. 17/180,672, filed on Feb. 19, 2021.

(51) Int. Cl.
| | |
|---|---|
| *G06F 9/50* | (2006.01) |
| *G06F 9/445* | (2018.01) |
| *G06F 9/30* | (2018.01) |
| *G06F 9/355* | (2018.01) |

(52) U.S. Cl.
CPC .......... *G06F 9/505* (2013.01); *G06F 9/30123* (2013.01); *G06F 9/3555* (2013.01); *G06F 9/44505* (2013.01); *G06F 9/5038* (2013.01)

(58) Field of Classification Search
CPC ...................................................... G06F 9/505
See application file for complete search history.

(56) References Cited

U.S. PATENT DOCUMENTS

| | | | |
|---|---|---|---|
| 6,081,896 A * | 6/2000 | Johns-Vano | G06F 9/30025 710/1 |
| 10,437,496 B1 | 10/2019 | Brinicombe | |
| 2009/0318074 A1 * | 12/2009 | Burge | H04L 67/34 455/3.01 |
| 2012/0117567 A1 * | 5/2012 | Amano | G06F 9/5077 718/1 |
| 2012/0290714 A1 | 11/2012 | Cohen | |
| 2013/0067162 A1 | 3/2013 | Jayaraman et al. | |

* cited by examiner

*Primary Examiner* — Charlie Sun
(74) *Attorney, Agent, or Firm* — Reches Patents

(57) ABSTRACT

A method for hierarchical workload allocation in a storage system, the method may include determining to reallocate a compute workload of a current compute core of the storage system; wherein the current compute core is responsible for executing a workload allocation unit that comprises one or more first type shards; and reallocating the compute workload by (a) maintaining the responsibility of the current compute core for executing the workload allocation unit, and (b) reallocating at least one first type shard of the one or more first type shards to a new workload allocation unit that is allocated to a new compute core of new compute cores.

13 Claims, 6 Drawing Sheets

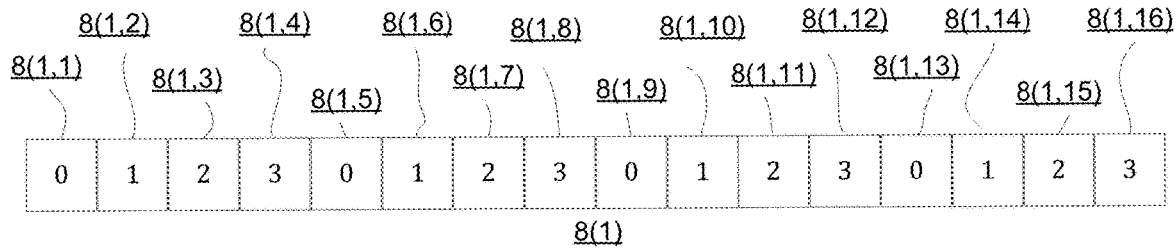
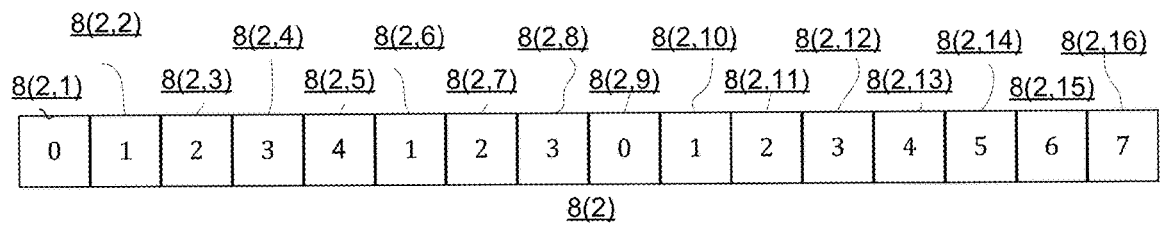
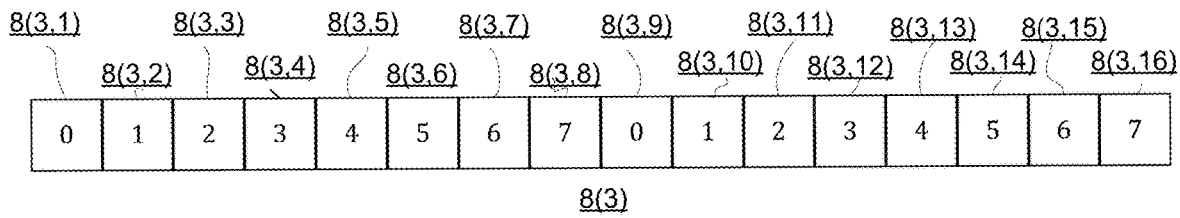
FIG. 1A

Reallocating load between (a) new compute cores of the storage system, and (b) current compute cores of the storage system that are responsible to execute current workload allocation units that comprise multiple first type shards, each workload allocation unit comprises a plurality of first type shards. 20

Defining new workload allocation units. 22

Modifying the current workload allocation units by reallocating at least some of the multiple first type shards from the current workload allocation units to the new workload allocation units. 24

Reallocating at least one second type shard of the one or more second type shards to a new compute core of the new compute cores. 26

Performing load balancing on a workload allocation unit basis, following a completion of the storage system reconfiguration process 30

Determining to reallocate a compute workload of a current compute core of the storage system; wherein the current compute core is responsible for executing a workload allocation unit that may include one or more first type shards. 60

Reallocating the compute workload by (a) maintaining the responsibility of the current compute core for executing the workload allocation unit, and (b) reallocating at least one first type shard of the one or more first type shards to a new workload allocation unit that is allocated to a new compute core of new compute cores. 70

Delaying a reallocation of a first type shard of the at least one first type shard until a completion of execution of the first type shard. 72

Reallocating at least one first type shard of the one or more second type shards to a new workload allocation unit that is allocated to a new compute core of new compute cores. 74

Delaying a reallocation of a second type shard of the at least one second type shard until a completion of execution of the second type shard. 76

HIERARCHICAL WORKLOAD ALLOCATION IN A STORAGE SYSTEM

CROSS REFERENCE

This application is a continuation in part of U.S. patent application Ser. No. 17/180,672 filing date Feb. 12, 2021 which is incorporated herein by reference.

TECHNICAL FIELD

The present disclosure generally relates to the field of data storage, and more particularly to workload allocation in storage systems.

BACKGROUND

A storage system may include multiple compute nodes and multiple storage nodes. Non-limiting examples of compute nodes and storage nodes are illustrated in US patent application 2019/0141128 which is incorporated herein by reference.

Large-scale distributed storage systems are aimed to support the growing demand to storage, as well as the need for dynamic scale-out on demand.

A Large-scale distributed storage system is generally composed of multiple server nodes that share the workload.

Workload can be dynamically changed in a storage system, causing bottlenecks in certain nodes. To eliminate the system bottlenecks and optimize the resource utilization, there is a demand for employing a workload balancing and adaptive resource management.

Workload balancing is particularly important upon scaling out of the storage system, i.e., upon adding new server nodes, where there is a need to re-allocate the workload, to take advantage of the new compute resources.

There is a need to provide a workload allocation scheme that scales in an efficient manner and to re-balance the workload upon a scale out of a storage system, without disrupting the storage operations being performed by the current nodes.

SUMMARY

There may be provide a storage system, a method and a non-transitory computer readable medium for hierarchical workload allocation in a storage system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1A illustrates an example of a reallocation;
FIG. 2 illustrates an example of a method;
FIG. 3 illustrates an example of a method.

DETAILED DESCRIPTION

Figure 1B:
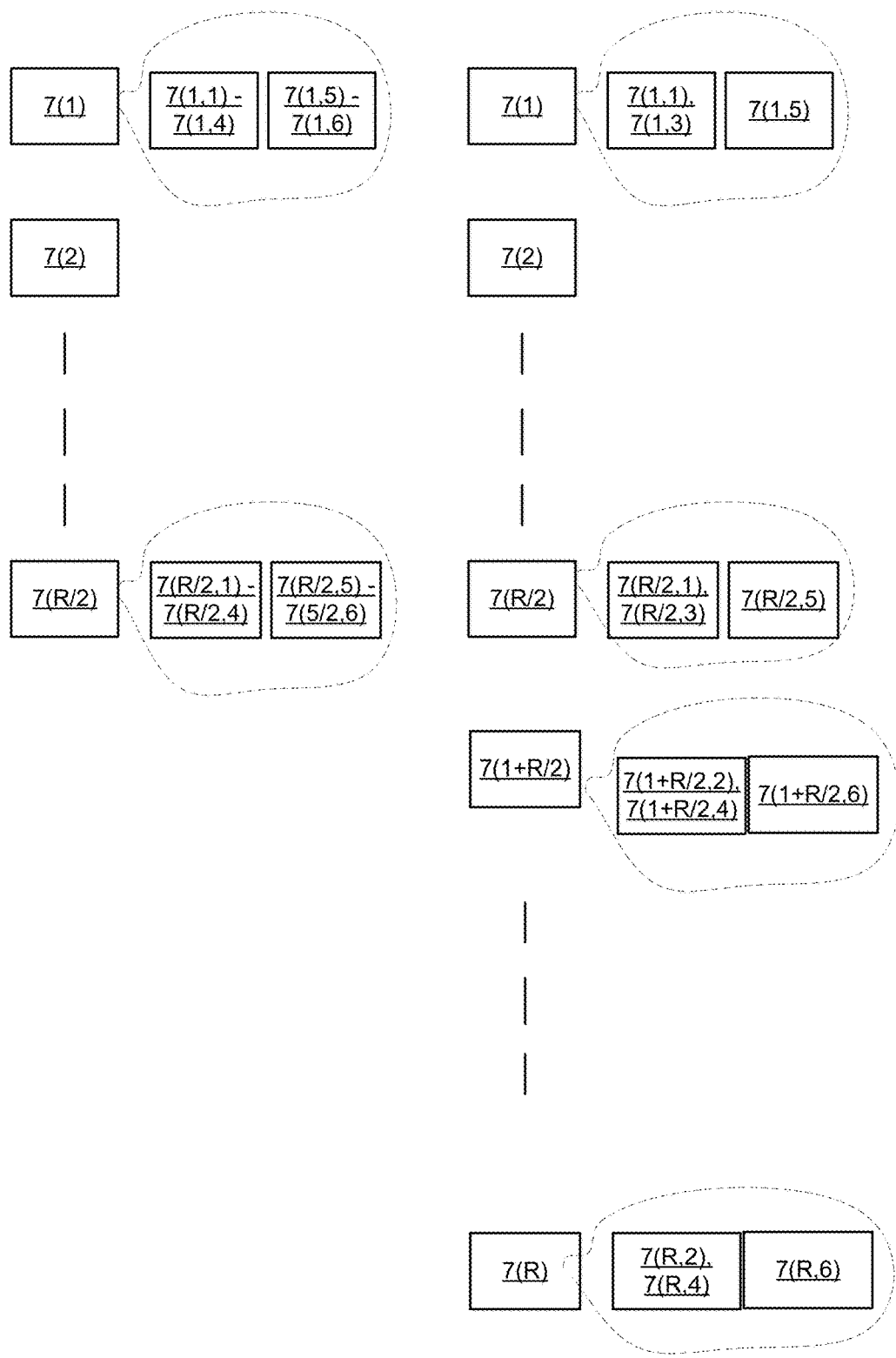
FIG. 1B illustrates an example of a reallocation.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

At least part of the compute workload imposed on the compute nodes of the storage system may be logically sharded into multiple portions. Part of the portions are called first type shards, while others are called second type shards.

The term "first type" with regard to the first type shards may relate to one or more of: a first type of storage tasks being under the responsibilities of the first type shards; a first type of workload imposed by the first type shards; a first type of storage spaces, objects or resources associated with the first type shards; the number of the first type shards, or the granularity used for sharding (fragmenting) the first type storage tasks or workload into the first type shards.

The term "second type" with regard to the second type shards may relate to one or more of: a second type of storage tasks being under the responsibilities of the second type shards, that may differ from the first type of storage tasks; a second type of workload imposed by the second type shards that may differ from the first type of workload; a second type of storage spaces, objects or resources associated with the second type shards, that may differ from those associated with the first type shard; the number of the second type shards, or the granularity used for sharding the second type storage tasks or workload into the second type shards, where the number and granularity are different from those used for sharding the first type shards. A first type shard or a second type shard can be regarded as a portion of the total compute workload of the storage system.

When the storage system is installed, the number of second type shards is determined according to the storage system size, e.g., according to the number of central processing units or the amount of storage space of the storage system.

The number of the first type shards may be determined so as to fit any size of future scale out of the storage system, therefore the number of first type shard may exceed the second type shards in an initial installation, as well as in subsequent scale-out configurations.

Workload allocation units are defined so as to encapsulate multiple first type shards and at least one second type shard. The workload allocation units are assigned to CPUs, where each CPU accommodates one or more whole numbers of workload allocation units. If the workload is not balanced, then some CPUs may not be assigned with workload allocation units. The number of workload allocation units may be correlated to the number of second type shards, and may be, as well, determined according to the storage system size, e.g., according to the number of central processing units or the amount of storage space of the storage system.

When the storage system is scaled out, new compute nodes that include new compute cores (e.g., CPUs) are added.

When a substantial number of new CPUs is added—the original number of second type shards and workload allocation units may not be sufficient for optimally balancing the load on the CPUs, and there may be scenarios where the number of second type shards and workload allocation units is lower than the number of CPUs, leading to non-utilized computing resource.

Defining a large number of second type shards and workload allocation units in advance (for example when the storage system is first installed) may not be efficient, since there may not be enough compute workload to effectively partition to the large number of second type shards. There may also be a waste of metadata storage space, due to metadata needed to be associated with each second type shard and/or workload allocation unit, and further a waste of compute efforts related to managing the larger amount of second type shards and/or workload allocation units.

There is provided a system, a method and a non-transitory computer readable medium for hierarchical workload allocation in a storage system such as a large scale storage system.

A large scale storage system may include tens, hundreds, thousands, hundred-thousands and even more storage nodes and tens, hundreds, thousands, hundred-thousands and even more compute nodes.

A storage node may include multiple storage devices such as a volatile storage device, and non-volatile storage devices. A storage device may include a Solid State Device (SSD), a non-volatile random access memory (NVRAM), a volatile random access memory (RAM), and the like.

Non-limiting examples of compute nodes and storage nodes are illustrated in US patent application 2019/0141128 which is incorporated herein by reference.

For simplicity of explanation some of the following text may refer to a method.

There may be provided a method for hierarchical workload allocation that provides an effective scheme load balancing.

The method is hierarchical in the sense that is uses workload allocation units that may include one or more second type shards and one or more first type shards. The workload allocation process may maintain a workload allocation unit—but may change its content—for example by reallocating one or more first type shard and/or second type shard to another workload allocation unit.

At least part of the storage tasks of the storage system are logically sharded into multiple units called shards. A shard contributes a portion of the total compute workload of the storage system. A first type shard is responsible for a portion (a shard) of a first type of storage tasks, and a second type shard is responsible for a portion of a second type of storage tasks. More than one sub-type of storage tasks may be included in the first type storage tasks and more than one sub-type of storage tasks may be included in the second type storage tasks.

The maximal number of the first type shards may exceed the maximal number of second type shards. For example there may be a factor of at least 2, 4, 8, 16, 32, 64 and more between the maximal number of second type shards and the maximal number of first type shards. Accordingly—the first type shards may be regarded as being of a higher resolution (or higher granularity) than the second type shards.

The maximal number of the first type of shards may be the highest number of first type shards that is assigned upon any configuration over a group of different configurations of the storage system, where the configurations or scales of the storage system may refer to: the number of compute nodes in the storage system, the number of storage nodes, or a combination of both. For example—when the storage system is scalable—the number of the first type shards may be the highest number of first type shards over a group of scales of the storage system. The group of configurations and/or the group of scales may include any (or only some) of the possible configurations and/or scales. The same applies to the maximal number of the second type of shards.

It should be noted that the maximal number of the first type shards for a certain configuration of the storage system may exceed the maximal number of second type shards for the certain configuration of the storage system.

In a current configuration of the storage system—the number of the second type of shards and/or the number of first type shards may depend on one or more parameters of current configuration of the storage system—for example, the number of compute cores.

The reallocation of the first type shard and/or second type shard is very simple and efficient.

The reallocation may maintain the association between a compute core and a workload allocation unit.

Alternatively—the reallocation may change the association of a compute core and the workload allocation unit.

In a relatively small storage system, a workload allocation unit may include more first type shards in relation to the first type shards of a workload allocation unit of a larger storage system.

In a steady state, the load management is made on a workload allocation unit basis—and the number of workload allocation units may increase with the size of the storage system. This workload allocation unit-based load management is simpler than performing first type shard based management—especially when the number of first type shards well exceeds the number of the workload allocation units.

When the size of the storage system significantly increases—new workload allocation units are created and first type shards (and/or second type shards) are reallocated from current workload allocation units to the newly created workload allocation units—which may involve splitting current workload allocation units.

The larger number of first type shards enables a fine-grained workload allocation—which further increases the efficiency of the load balancing, and particularly—reallocating the first type shards to new workload allocation units and still maintaining efficiency of the load balancing when the system scales out.

The workload allocation units are dynamically associated with compute cores of the compute nodes of the storage system, so that a compute core may provide compute resources to one or more first and second type shards.

The first type shards can be easily relocated among workload allocation units, which in turn can be easily reallocated among compute cores.

First type shards may be associated with first type storage tasks that are related to objects or elements of large amounts (that can be divided to the larger number of first type shards).

First type shards may be associated with first type storage tasks that are related to objects that are not dependent on the storage system configuration and scale. For example, first type shards may be associated with first type storage tasks related to files or to parts of files (may be defined by an offset range or an offset within a file).

Second type shards may be associated with second type storage tasks that are related to assets that are dependent on the storage system scale. For example—some assets of the storage system may be limited (by overall number) in smaller storage systems, and there may not be enough of them for being shared among the first type shards. Therefore, these assets may be associated with second type shards and not with first type shards.

Non-limiting examples of second type storage tasks may include migration of data from write buffers in a temporary storage space (such as but not limited to NVRAM write buffers) to a permanent space in storage devices, such as SSDs.

The size of the NVRAM and the corresponding number of write buffers, in a small storage system, may not be large enough for splitting among first type shards, and therefore the responsibilities for handling write buffers are associated with second type shards.

The responsibilities associated with workload allocation units, second type shards, and first type shards, and the assignment of first and second type shards to workload allocation units, may be assigned in any manner—for example by applying a formula that may be based on at least some of (a) the workload allocation unit identifier, (b) the second type shard identifier, (c) the first type shard identifier, (d) the total number of workload allocation units, (e) the total number of the second type shards, (f) the total number of the first type shards, (g) the number of assets, and (h) the number of objects (e.g., object identifiers) to be split.

Responsibilities can be assigned in various manners. For example—by assigning queues of tasks according to first type shards identifiers, assigning files by applying a formula on the file identifier that is further based on the total number of first type shards, assigning write buffers based on the second type shard identifier and on an address ranges of the write buffers, etc.

When the storage system scales out and the number of compute cores is increased, such that the number of workload allocation units does not allow optimal workload balancing among all the compute cores (e.g., the number of compute cores is larger by at least a certain number than the number of workload allocation units, or only very few (e.g., 1) workload allocation units is assigned per compute core, so that load balancing is not efficient)—the number of workload allocation units may be increased, and an expansion process is initiated for rebalancing the tasks across a larger number of workload allocation units and for assigning the new workload allocation units to new compute cores.

An example of a reallocation of workload that follows a multiplication of the current number of compute cores by a factor (F), the reallocation may include:

a. Splitting the first type shards of the current (before multiplying the number of the compute core) workload allocation units between the current workload allocation units and one or more new workload allocation units. This should not involve changing the responsibilities of the first type shards.

b. Splitting the second type shards of the current workload allocation units between the current workload allocation units and one or more new workload allocation units.

Step (a) may include, for example, maintaining about (1/F) of the first type shards per each current workload allocation unit and reallocating about (1-1/F) of the first type shards per each current workload allocation unit. The number of maintained first type shards may depend on the relationship between the current number of first type shards of a current workload and F.

As indicated above—some first type shards are re-allocated from their current workload allocation units to new workload allocation units. For example, if the number of workload allocation units is doubled, then each workload allocation unit may waive half of its first type shards to a new workload allocation unit. Thus, if there are 512 workload allocation units when the storage system was initialized, and each owns 64 first type shards, then following the doubling of the number of workload allocation units to 1024, each workload allocation unit may own 32 first type shards. By re-allocating the first type shards, the first type storage tasks are automatically re-assigned, where each workload allocation unit gives up half of its task responsibilities. Responsibilities that were originally associated with second type shards, may be re-assigned by re-allocating a portion of the assets associated with second type shards from each workload allocation units to one or more new workload allocation units.

It should be noted that in some cases the reallocation of a second type shard or a first type shard may be delayed until a completion of an executed task of the second type shard or first type shard.

Accordingly—assets that are not currently subject to an ongoing task can be relocated. Assets that are occupied or locked, i.e., are subject to an ongoing task, will be reallocated when the task is completed.

Until a second type shard or a first type shard is re-allocated—the compute core currently associated with the execution of the second type shard or first type shard continues to execute the relevant second type shard or first type shard.

For example—referring to a second type storage task of migration of data from an NVRAM to SSDs.

When the reallocation starts, part of the NVRAM write buffers may be empty (ready for new writes, not waiting to be migrated) and part of the NVRAM write buffers may be at least partially full, i.e., in the middle of migration or waiting for migration by a current workload allocation unit that includes a second type shard associated with executing the migration.

Empty NVRAM write buffers can be immediately split among the current workload allocation units and new workload allocation units. On the other hand—at least partially full NVRAM write buffers are split only after the data stored therein is migrated.

The split process related to a specific workload allocation unit is completed when all the assets under its responsibility are freed and their respective second type shard can be reassigned, e.g., when the previously at least partially full write buffers are emptied and reassigned.

Unlike splitting of assets being handled by the second type shards, splitting of first type shards is instantaneous.

When the split process of a workload allocation unit is completed, the new workload allocation unit associated with the split, with its new assigned shards and associated tasks, is activated, i.e., associated with a new compute core that can start executing the tasks of the second type shards and/or first type shards under its responsibilities.

Measures are taken so as not to delay ongoing tasks due to the split process. Therefore, as long as the new workload allocation units are not activated, the old workload allocation units can perform tasks that are intended to be re-allocated to the new workload allocation units, on behalf of the new workload allocation units. For example, during the split process, new data may be written to the NVRAM write buffers, either NVRAM write buffers that remain under the old ownership, or NVRAM write buffer that are associated with a new ownership of a new workload allocation unit that is not yet activated. The NVRAM write buffers of the non-activated workload allocation unit may be handled by the old allocation unit on behalf of the new assigned non-activated workload allocation units.

Each first type shard may be associated with a workload allocation units according to any formula or process—for example a round robin scheme.

For example, if there are M workload allocation units in the system (numbered 0 . . . M−1), then the first type shard is associated with workload allocation unit 0, the second first type shard is associated with workload allocation unit 1, and the m'th first type shard is associated with workload allocation unit M−1. Then the next round where the (m+1)th first type shard is associated with workload allocation unit 0, the (m+2)'th first type shard is associated with workload allocation unit 1, and the (2*m)'th first type shard is associated with workload allocation unit M−1, and so on. A workload allocation unit m will be assigned with first type shards: m'th, (m+M)'th, (m+2*M)'th, etc.

The following formula can translate a first type shard into the workload allocation unit m that currently owns the first type shard: m=(n modulo M), where n is the number of the first type shard. A similar method may be applied to second type shards, but based on a different number of the second type shards.

When the number of workload allocation units is increased, for example, when M is doubled—then according to the round robin scheme, each workload allocation unit will give away every second first type shard in favor of a new workload allocation unit.

Allocating assets handled by second type shards to workload allocation units (or assignment of second type shards to workload allocation units) is performed in a similar manner. For example, suppose the NVRAM write buffers are regarded as a logical space of K NVRAM write buffers, numbered 0 to K. The NVRAM write buffers are associated with workload allocation units in a round robin manner. When the number of workload allocation units M is doubled—then according to the round robin scheme, each workload allocation unit will retain every odd NVRAM write buffer and give away every even NVRAM write buffer in favor of a new workload allocation unit.

The following formula may be used for obtaining the workload allocation unit m that is responsible for migrating a certain NVRAM write buffer i: m=i modulo M.

FIG. 1A illustrates sixteen NVRAM write buffers 8 at different times and their ownership by workload allocation units. NVRAM write buffers (8,1) are illustrated with their owning workload allocation units (0-3) before splitting responsibilities of four workload allocation units to eight workload allocation units. Buffers (8,3) are illustrated with their owning workload allocation units (0-7) after splitting responsibilities of four workload allocation units to eight workload allocation units, and buffers (8,2) are illustrated with their owning workload allocation units during a transition from four to eight workload allocation units.

NVRAM write buffers 8(1) are administrated by four workload allocation units (numbered 0-3), each workload allocation unit administrates four NVRAM write buffers, where workload allocation unit 0 is responsible for NVRAM write buffers 8(1,1), 8(1,5), 8(1,9) and 8(1,13). In the same manner, workload allocation unit 3 is responsible for NVRAM write buffers 8(1,4), 8(1,8), 8(1,12) and 8(1,16).

At time t3, after splitting the four workload allocation units into eight workload allocation units, each workload allocation unit administrates two NVRAM write buffers, where workload allocation unit 0 is responsible for NVRAM write buffers 8(1,1), 8(1,9), after giving away NVRAM write buffer 8(3,5),(3,13) to the new workload allocation unit 4. In the same manner, workload allocation unit 2 is responsible for NVRAM write buffers 8(3,3) and 8(3,11), after giving away NVRAM write buffer 8(3,5),(3,15) to the new workload allocation unit 6.

At time t2, a splitting process is in progress. Some of the NVRAM write buffers 8(2) were already re-allocated from their old ownership to the new ownership under the new workload allocation units 4-7.

Workload allocation unit 0, in this example already gave away half of its NVRAM write buffers to a new workload allocation unit 4. For example, NVRAM write buffers 8(2,1) and 8(2,9) remain under the responsibility of workload allocation unit 0, while buffers 8(2,5) and 8(2,13) are now under the responsibility of new workload allocation unit 4.

Other workload allocation units gave away only part of their NVRAM write buffer. For example, workload allocation unit 1 only gave away NVRAM write buffer 111(2,14) to be administrated by new workload allocation unit 5, while NVRAM write buffer 111(2,6) is still under the responsibility of workload allocation unit 1, and will be handed over to workload allocation unit 5, once the buffer becomes available (e.g., migration of its data is completed).

Since workload allocation unit 0 finishes its duty of splitting NVRAM write buffers, workload allocation unit 4 can be activated and associated with a CPU. At this stage, part of the workload allocation units (0 and 4) act as if there are eight workload allocation units in the system (in terms of assets allocation) while the other workload allocation units acts as if there are four workload allocation units in the system. Therefore, each workload allocation unit is associated with the number of workload allocation units that dictates its allocation scheme. Therefore, workload allocation units 0 and 4 are associated with an allocation scheme that corresponds to eight workload allocation units, while workload allocation units 1-3, during the transition stage, are associated with an allocation scheme that corresponds to four workload allocation units.

When the transition stage is completed, all the workload allocation units will be associated with an allocation scheme that corresponds to eight workload allocation units. The association of workload allocation units with the number of workload allocation units in the system may be reflected in the workload allocation unit identifier, i.e., the workload allocation unit identifier may be indicative of a private identifier (e.g., a sequence number) and the number of workload allocation units in the system (or during a transition stage—the number of workload allocation units associated with the workload allocation unit's allocation scheme).

Non-limiting example of second type storage tasks that are sharded to second type shards may include migration of data (among different storage devices or between a temporary storage space and a permanent storage space). None limiting examples of first type storage tasks sharded to first type shards may include tasks related to filesystem elements (e.g., files), defragmentation, deletion of large file areas, data reduction (compression, deduplication), RAID operations, etc.

Different first type (or second type) shards may be associated with different storage tasks. For example, part of the first type shards may be associated with data reduction tasks and other part of the second type shards maybe associated with storage tasks related to filesystem tasks, etc.

The first and second type shards may also be assigned with portions of large metadata and data space that are related to the type of tasks handled by the shards. For example: a first type shard that is associated with data reduction may be associated with a portion of deduplication metadata (e.g., deduplication hash tables). As for another example, each first type shard that is associated with filesystem tasks maybe associated with a portion of a huge metadata related to filesystems.

An example of how a portion of filesystem metadata is associated with first type shards may include: each file in the system has an identifier (e.g., the file handle or filename) that can be hashed, or be subject to other formula that can be applied on the file identifier, so as to provide a key to entries in the metadata. The key may define a root of a tree that holds all the metadata of a file. Each first type shard may be assigned with a range of keys that are associated with metadata trees of files or other objects, or with a formula that depends on the first type shard identifier, so as to define which keys (i.e., which files) are associated with the first type shard. A large file may be further split among first type shards, therefore each first type shard may be assigned with file keys and offsets associated with the keys—all being defined by a formula that is based on the first type shard identifier.

Another example of a space that may be split among second type shards is a temporal storage space for storing data of write requests. Data of write requests may be stored in a non-volatile memory (NVRAM) before being acknowledged to the clients' computers that sent the requests. Background processes, handled by the second type shards, may include migrating the data stored in the NVRAM to a permanent storage, e.g., SSD devices. The temporal space, such as the NVRAM, may be split among second type shards, by using a formula that is based on the second type shard identifier and on offsets of sections within the NVRAM, so that each shard is associated with multiple sections of the NVRAM.

FIG. 1B illustrates an example of workload allocation units 7(1)-7(R), R being an even integer.

It is assumed that before the workload allocation there were (R/2) workload allocation units 7(1)-7(R/2) that includes various shards.

For example, each workload allocation unit may include four first type shards 7(r,1)-7(r,4), and two second type shards 7(r,5) and 7(r,6). Index r ranges between 1 and R/2.

The reallocation includes doubling the number of workload allocation units to R and therefore providing workload allocation units 7(1)-7(R), and maintaining half of the shards per workload allocation unit.

For example, each workload allocation unit may include two first type shards and a second type shard. For example— each one of workload allocation units 7(1)-7(R/2) includes first type shards 7(r,1) and 7(r,3), and second type shard 7(r,5)—each one of workload allocation units 7(1+R/2)-7(R) (the new workload allocation units) includes first type shards 7(r,2) and 7(r,4), and second type shard 7(r,6). Index r ranges between 1 and R.

FIG. 2 illustrates an example of method 10.

Method 10 may be for hierarchical workload allocation in a storage system.

Method 10 may start by step 20 of reallocating load between (a) new compute cores of the storage system, and (b) current compute cores of the storage system that are responsible to execute current workload allocation units that comprise multiple first type shards, each workload allocation unit comprises a plurality of first type shards, which is a portion of the multiple first type shards executed by the current workload allocation units.

Step 20 may include steps 22 and 24.

Step 22 may include defining new workload allocation units.

Step 24 may include modifying the current workload allocation units by reallocating at least some of the multiple first type shards from the current workload allocation units to the new workload allocation units.

At least one of the current workload allocation units may further include one or more second type shards; wherein a maximal number of first type shards exceeds a maximal number of second type shards.

Step 20 may also include step 26 of reallocating at least one second type shard of the one or more second type shards to a new compute core of the new compute cores. The at least one second type shard may be reassigned to a new workload allocation unit that is further assigned to the new compute core. In case there are not enough second type shards to share with the new compute cores, a portion of the responsibilities of current second type shards may be re-assigned to new defined second type shards.

Step 20 may be executed during a storage system reconfiguration process that may include adding new compute cores to the storage system.

Method 10 may also include step 30 of performing load balancing on a workload allocation unit basis, following a completion of the storage system reconfiguration process. Load balancing that is performed on a workload allocation unit basis may include re-allocating one or more workload allocation units from one compute core to another compute core. The reallocating may include instructing a compute core to remove a certain workload allocation unit, identified by a workload allocation unit identifier, from the workload allocation units under its responsibilities, and instructing another compute core to add the certain workload allocation unit to workload allocation units under the other compute core's responsibilities. All the workload allocation units allocated to compute cores of the storage system are known to all the compute cores by global identifiers of the workload allocation units.

The combination of steps 20 and 30 allows steady state load balancing on a workload allocation unit basis (which is compact in the senses of using fewer metadata), while the reallocation can be done at a higher resolution of the shard basis. The steady state refers to load balancing that is performed when the number of compute nodes is not changed, or when the change in this number is minor and does not require defining new workload allocation units.

FIG. 3 illustrates an example of method 50.

Method 50 may be for hierarchical workload allocation in a storage system.

Method 50 may start by step 60 of determining to reallocate a compute workload of a current compute core of the storage system; wherein the current compute core is responsible for executing a workload allocation unit that may include one or more first type shards.

The determining may be made for various reasons—for example an increase in the number of compute nodes—for example an increase of at least a certain number (or certain percentage) of the overall number of compute nodes.

Step 60 may be followed by step 70 of reallocating the compute workload by (a) maintaining the responsibility of the current compute core for executing the workload allocation unit, and (b) reallocating at least one first type shard of the one or more first type shards to a new workload allocation unit that is allocated to a new compute core of new compute cores.

Step 70 may include step 72 of delaying a reallocation of a first type shard of the at least one first type shard until a completion of execution of the first type shard. The completion of execution may refer to a completion of a specific operation currently handled by the first type shard.

The workload allocation unit may further include one or more second type shards. The maximal number of first type shards may exceed a maximal number of second type shards.

Step 70 may also include step 74 of reallocating at least one second type shard of the one or more second type shards to the new workload allocation unit that is allocated to the new compute core of the new compute cores. In case there are not enough second type shards to share with the new compute cores, a portion of the responsibilities of current second type shards may be re-assigned to new defined second type shards.

Step 74 may include step 76 of delaying a reallocation of a second type shard of the at least one second type shard until a completion of execution of the second type shard.

The second type storage task may include migrating data from a write buffer in a temporal storage space to a permanent space and step 76 may include waiting to reallocate the second type shard until after the write buffer is empty, i.e., the data is migrated.

The one or more second type shards are associated with scalable assets of the storage system. The scalable assets maybe storage space or compute resources or any asset that changes its number when the storage system is scaled.

One or more first type shards are associated with entities that are indifferent to a number of compute cores of the storage system. Such an entity may be a file or any other entity that does not change when the number of compute cores of the storage system changes.

It should be noted that the reallocating may include reallocating only a first type shard, or only a second type shard or a combination of a first type shard and a second type shard.

Step 60, 70 and 80 may be executed during a storage system reconfiguration process that may include adding new compute cores to the storage system.

Steps 70 and 80 may be followed by step 90 of performing load balancing on a workload allocation unit bases, following a completion of the storage system reconfiguration process.

Any one of method 10 and 60 may include executing shards following the reallocation. The executing of the shards includes executing storage tasks that are defined under the responsibilities of these shards.

Any one of method 10 and 60 may be executed by any part of the storage system (for example by one or more compute nodes), and/or may be executed (at least in part) by a computerized system outside the storage system.

It should be noted that any reference to a reallocation of the compute workload by reducing the content of a workload allocation unit may be applied mutatis mutandis to a reallocation of the compute load by increasing the content of a workload allocation unit. Any reference to an allocation of the compute workload related to adding new compute cores may be applied mutatis mutandis to a reduction of compute nodes.

Any reference to a removal of a shard from a workload allocation unit may be applied mutatis mutandis to an addition of a shard to a workload allocation unit.

There may be provided a method for hierarchical workload allocation in a storage system, the method may include determining to reallocate a compute workload of a current compute core of the storage system; wherein the current compute core may be responsible for executing a workload allocation unit that may include one or more first type shards; and reallocating the compute workload by (a) maintaining the responsibility of the current compute core for executing the workload allocation unit, and (b) reallocating at least one shard of another workload allocation unit to the workload allocation.

The at least one shard may be a first type shard.

The at least one shard may be a second type shard. A maximal number of first type shards exceeds a maximal number of second type shards.

The at least one shard may include one or more first type shards and one or more second type shards.

The method may include delaying a reallocation of a shard to the workload allocation unit until a completion of execution of the shard.

The reallocating may be executed during a storage system reconfiguration process that may include reducing compute cores from the storage system.

The may include performing load balancing on a workload allocation unit bases, following a completion of the storage system reconfiguration process.

There may be provided a method for hierarchical workload allocation in a storage system, the method may include reallocating load between a group of compute cores of the storage system. The reallocating include assigning to the group of compute cores shards that belonged (before the reallocation) to one or more compute cores that did not belong to the group. The reallocating may include adding shards to a group of workload allocation units, the shards did not belong to the group of workload allocation units.

Figure 4A:
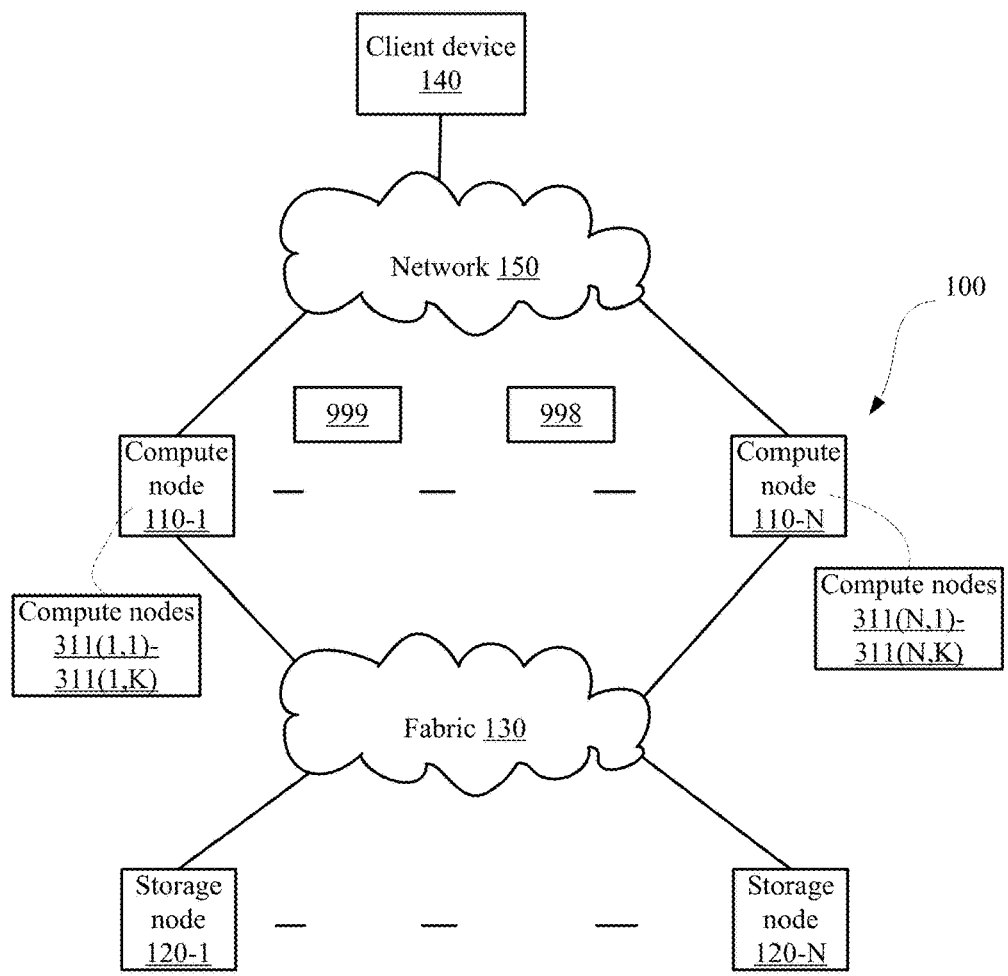
FIG. 4A is an example of a storage system.

FIG. 4A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 4D.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 4C and 4D, each storage node 120 further includes a non-volatile random-access memory (NVRAM) and an interface module for interfacing with the compute nodes 110.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniB and fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

FIG. 4A also illustrates a load monitor 998 and a load balancer 999. The load balancer 999 and the load monitor 998 may be included in one of the compute nodes, may be located outside any of the compute nodes, may be combined, may include one or more compute cores, may be executed by one or more compute cores, and the like. There may be more than a single load balancer and a single load monitor.

Figure 4B:
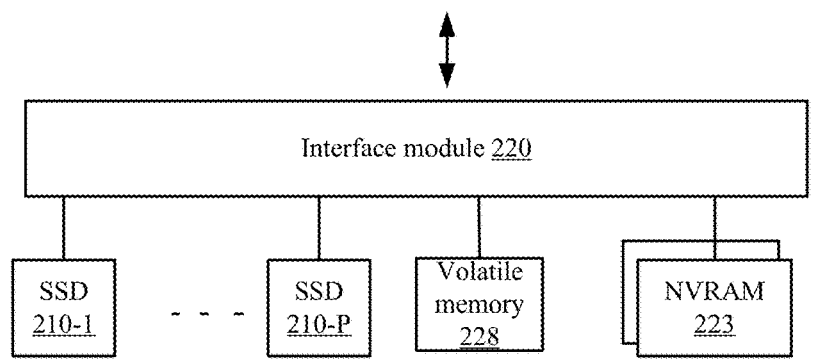
FIG. 4B is an example of a storage node.

FIG. 4B shows an example block diagram illustrating a storage node 120 according to an embodiment. The storage node 120 includes a plurality of storage devices such as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data may kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

Figure 4C:
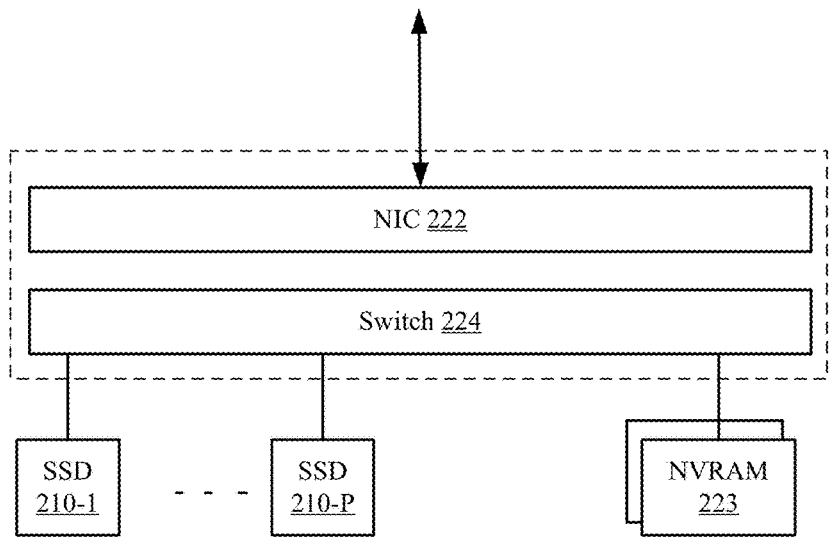
FIG. 4C is an example of an interface module of a storage node.

FIG. 4C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 4A) over the communication fabric (130, FIG. 4A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch.

In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 4D:
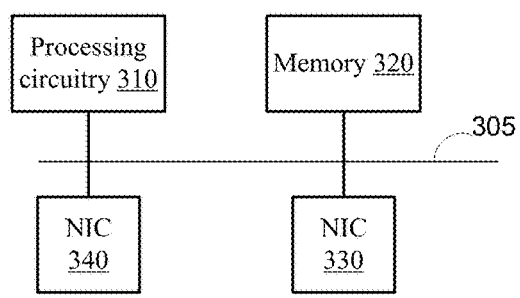
FIG. 4D is an example of a compute node.

FIG. 4D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 4A) to provide remote direct memory access to data stored in the storage nodes. In an embodiment, the first NIC 130 may enable communication via RDMA protocols such as, but not limited to, InfiniB and, RDMA over Converged Ethernet (RoCE), iWARP, and the like.

The second NIC 340 allows the compute node 110 to communicate with client devices (e.g., client device 140, FIG. 4A) through a communication network (e.g., the network 150, FIG. 4A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for hierarchical workload allocation in a storage system, the method comprising:
  determining to reallocate a compute workload of a current compute core of the storage system; wherein the current compute core is responsible for executing a workload allocation unit that comprises one or more first type shards and one or more second type shards; wherein a maximal number of first type shards exceeds a maximal number of second type shards; and
  reallocating the compute workload by (a) maintaining the responsibility of the current compute core for executing the workload allocation unit, (b) reallocating at least one first type shard of the one or more first type shards to a new workload allocation unit that is allocated to a new compute core of new compute cores; and (c) reallocating at least one second type shard of the one or more second type shards to the new compute core of the new compute cores.

2. The method according to claim 1 comprising delaying a reallocation of a second type shard of the at least one second type shard until a completion of execution of a second type storage task associated with the second type shard.

3. The method according to claim 2 wherein the second type storage task comprises migrating data from a write buffer to a permanent space; wherein the reallocation of the second type shard is completed after the write buffer is empty.

4. The method according to claim 1 wherein the one or more second type shards are associated with scalable assets of the storage system.

5. The method according to claim 1 wherein the one or more first type shards are associated with entities that are indifferent to a number of compute cores of the storage system.

6. The method according to claim 1 wherein the one or more first type shards are associated with files or parts of files.

7. The method according to claim 1 wherein the reallocating is executed during a storage system reconfiguration process that comprises adding new compute cores to the storage system.

8. The method according to claim 7 comprising performing load balancing on a workload allocation unit basis, following a completion of the storage system reconfiguration process.

9. A method for hierarchical workload allocation in a storage system, the method comprising: reallocating load between (a) new compute cores of the storage system, and (b) current compute cores of the storage system that are responsible to execute current workload allocation units that comprise multiple first type shards, each workload allocation unit comprises one or more first type shards; wherein at least one of the current workload allocation units further comprises one or more second type shards; wherein a maximal number of first type shards exceeds a maximal number of second type shards; wherein the reallocating of the bad comprises: defining new workload allocation units; and modifying the current workload allocation units by reallocating at least some of the multiple first type shards from the current workload allocation units to the new workload allocation units; and reallocating at least one second type shard of the one or more second type shards to a new workload allocation unit of a new compute core of the new compute cores.

10. The method according to claim 9 wherein the reallocating is executed during a storage system reconfiguration process that comprises adding the new compute cores to the storage system.

11. The method according to claim 10 comprising performing load balancing on a workload avocation unit basis, following a completion of the storage system reconfiguration process.

12. A storage system, the storage system comprising:
  a multiple processing circuitry, multiple storage nodes and a load balancer, wherein the load balancer is configured to:
    determine to reallocate a compute workload of a current processing circuitry of the storage system;

wherein the current processing circuitry is responsible for executing a workload avocation unit that comprises one or more first type shards and one or more second type shards; wherein a maximal number of first type shards exceeds a maximal number of second type shards; and reallocate the compute workload by (a) maintaining the responsibility of the current processing circuitry for executing the workload allocation unit, (b) reallocating at least one first type shard of the one or more first type shards to a new workload allocation unit that is allocated to a new processing circuitry of new processing circuitry; and (c) reallocating at least one second type shard of the one or more second type shards to the new processing circuitry of the new processing circuitry.

13. A non-transitory computer readable medium for workload allocation in a storage system, the non-transitory computer readable medium stores instructions for: determining to reallocate a compute workload of a current compute core of the storage system; wherein the current compute core is responsible for executing a workload allocation unit that comprises one or more first type shards and one or more second type shards; wherein a maximal number of first type shards exceeds a maximal number of second type shards; and reallocating the compute workload by (a) maintaining the responsibility of the current compute core for executing the workload allocation unit, (b) reallocating at least one first type shard of the one or more first type shards to a new workload allocation unit that is allocated to a new compute core of new compute cores; and (c) reallocating at least one second type shard of the one or more second type shards to the new compute core of the new compute cores.

* * * * *